US012105540B2

(12) United States Patent
Akerele

(10) Patent No.: US 12,105,540 B2
(45) Date of Patent: Oct. 1, 2024

(54) TEMPERATURE REGULATION DEVICE FOR BLEACH AND HAIR COLOR FORMULAS

(71) Applicant: L'Oreal, Paris (FR)

(72) Inventor: Dominic Akerele, Brooklyn, NY (US)

(73) Assignee: L'Oreal, Paris (FR)

( * ) Notice: Subject to any disclaimer, the term of this patent is extended or adjusted under 35 U.S.C. 154(b) by 218 days.

(21) Appl. No.: 17/900,575

(22) Filed: Aug. 31, 2022

(65) Prior Publication Data
US 2024/0069582 A1  Feb. 29, 2024

(51) Int. Cl.
| | |
|---|---|
| G05D 23/19 | (2006.01) |
| A45D 19/00 | (2006.01) |
| B01F 23/20 | (2022.01) |
| B01F 25/50 | (2022.01) |
| B01F 35/21 | (2022.01) |
| B01F 35/90 | (2022.01) |
| B01F 101/21 | (2022.01) |

(52) U.S. Cl.
CPC ......... *G05D 23/1931* (2013.01); *A45D 19/00* (2013.01); *B01F 23/20* (2022.01); *B01F 25/50* (2022.01); *B01F 35/2115* (2022.01); *B01F 35/90* (2022.01); *G05D 23/1917* (2013.01); *A45D 2200/155* (2013.01); *B01F 2035/98* (2022.01); *B01F 2035/99* (2022.01); *B01F 2101/21* (2022.01)

(58) Field of Classification Search
None
See application file for complete search history.

(56) References Cited

U.S. PATENT DOCUMENTS

| | | | | |
|---|---|---|---|---|
| 6,973,931 B1* | 12/2005 | King | ...................... | A45D 24/34 |
| | | | | 132/212 |
| 2019/0350344 A1* | 11/2019 | Park | ...................... | A45D 44/002 |
| 2024/0069579 A1* | 2/2024 | Akerele | ................. | A45D 34/00 |
| 2024/0069582 A1* | 2/2024 | Akerele | ................. | B01F 35/90 |

FOREIGN PATENT DOCUMENTS

| | | |
|---|---|---|
| DE | 102011076561 A1 | 11/2012 |
| EP | 4029600 A1 | 7/2022 |

OTHER PUBLICATIONS

Search Report and Written Opinion issued May 23, 2023, issued in corresponding French Application No. 2211100, filed Oct. 26, 2022, 7 pages.

\* cited by examiner

*Primary Examiner* — Paul R Durand
*Assistant Examiner* — Michael J. Melaragno
(74) *Attorney, Agent, or Firm* — CHRISTENSEN O'CONNOR JOHNSON KINDNESS PLLC

(57) ABSTRACT

A dispensing device, including a housing, a first connection to connect to a water source, a second connection to connect to a gas source, a formula reservoir, a mixing zone, a deposition zone, a circulation zone configured to circulate the water and the gas from the deposition area to the mixing zone, a valve connected to the deposition zone, configured to release the gas and water into the formula reservoir, a first temperature sensor to sense a first temperature when water and the gas enter the mixing zone, a second temperature sensor to sense a second temperature when water and gas enter the deposition zone, and, when a predetermined temperature is reached, direct the valve to open, and an opening coupled to the formula reservoir configured to deposit a mixture of one or more formulas, gas, and water.

20 Claims, 11 Drawing Sheets

TEMPERATURE REGULATION DEVICE FOR BLEACH AND HAIR COLOR FORMULAS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure describes a dispensing device, including a housing configured to surround the dispensing device, a first connection configured to connect to a water source, a second connection configured to connect to a gas source, a formula reservoir configured to hold one or more formulas, a mixing zone configured to mix water from the water source, and gas from the gas source, a deposition zone configured to contain the mixed air and gas, a circulation zone fluidly connected to the mixing zone and the deposition zone, where the circulation zone is configured to circulate the water and the gas from the deposition area to the mixing zone, a valve fluidly connected to the deposition zone, where the valve is configured to release the mixed gas and water into the formula reservoir, a first temperature sensor, located in the mixing zone, configured to sense a first temperature of the water and the gas when the water and the gas enter the mixing zone, a second temperature sensor located in the deposition zone, configured to sense a second temperature of the water and the gas when the water and the gas enter the deposition zone, and when a predetermined temperature is reached, direct the valve to open, and an opening fluidly coupled to the formula reservoir configured to deposit a mixture of the one or more formulas, the gas, and the water onto a surface.

In another aspect, a dispensing system including the dispensing device as described herein, and one or more formulas is disclosed.

In yet another aspect, the present disclosure defines a method of temperature controlling a mixture with a dispensing device, the method including dispensing water from a water source and a gas from a gas source, mixing the water and the gas in a mixing zone, measuring a first temperature of the water and the gas, directing the water and the gas into a deposition zone, measuring a second temperature as the water and gas are directed to the deposition zone, comparing the second temperature with the predetermined temperature, and when the second temperature and the predetermined temperature are equal, mixing the gas and water with one or more formulas to form the mixture, and dispensing the mixture onto a surface; or else, directing the water and gas to the circulation zone, and circulating the water and gas to the mixing zone.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
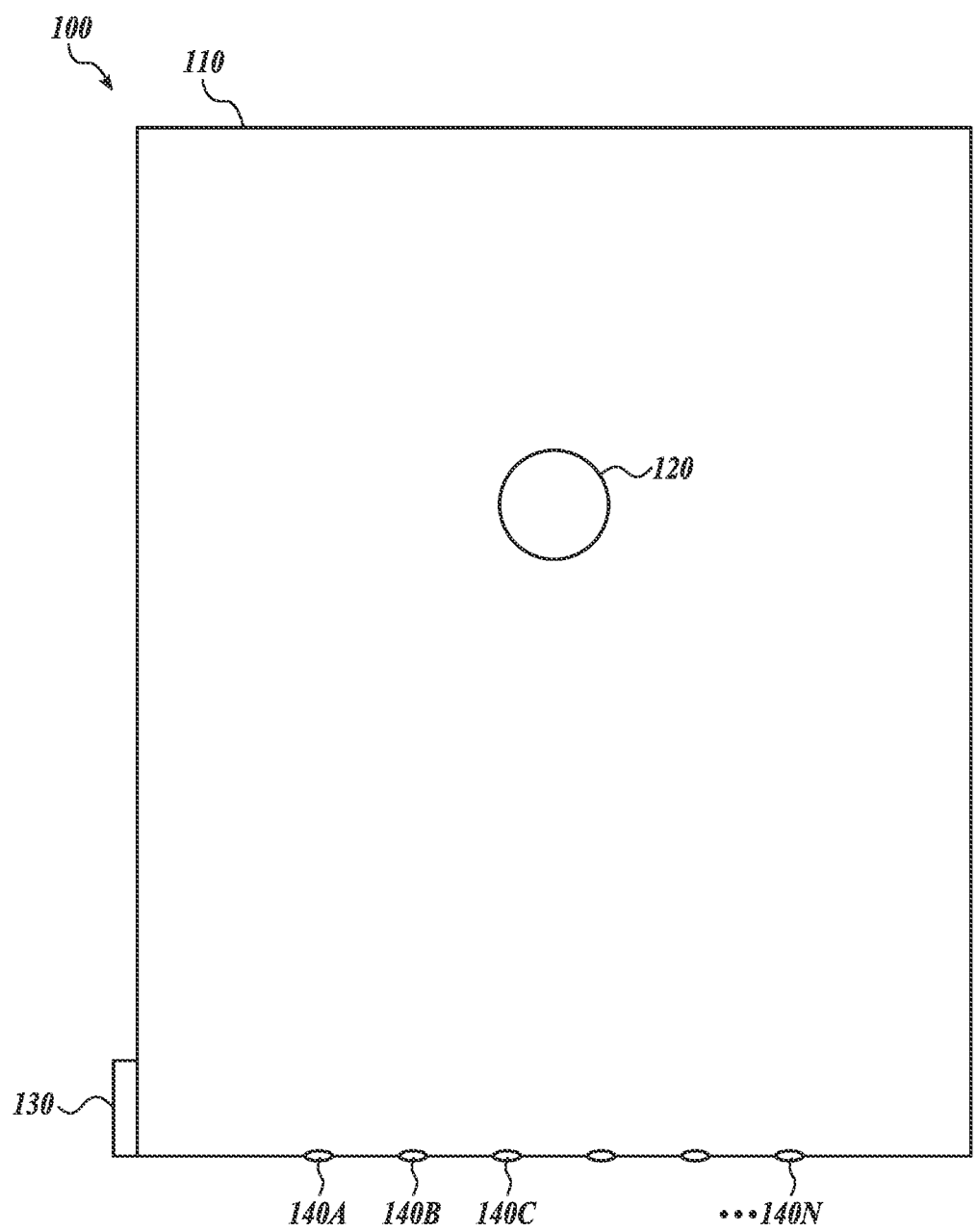
FIG. 1A is an example temperature regulation device, in accordance with the present technology.

While illustrative embodiments have been illustrated and described, it will be appreciated that various changes can be made therein without departing from the spirit and scope of the invention.

The present disclosure is directed towards a device for temperature regulation, configured to heat up or cool down a mixture of water and compressed gas using one or more temperature source. Temperature sensors inside the device periodically check the gas and water's temperature, as the mixture circulates through the device. When the desired temperature is reached, formula is mixed with the water and gas. In some embodiments, the formula is a hair product, such as bleach, toner, semi-permanent hair dye, or demi-permanent hair dye. In some embodiments, the desired (or predetermined) temperature is hardcoded into the device, provided by a routine generated by the device or a communicatively coupled smart device, or based on the identity of a formula. In some embodiments, by heating the water and gas to the predetermined temperature, the shade deposition, color reaction, processing time, speed of application, or a combination thereof is improved. In some embodiments, the predetermined temperature is the temperature needed for ideal reaction and hair processing.

In one aspect, the present disclosure describes a dispensing device, including a housing configured to surround the dispensing device, a first connection configured to connect to a water source, a second connection configured to connect to a gas source, a formula reservoir configured to hold one or more formulas, a mixing zone configured to mix water from the water source, and gas from the gas source, a deposition zone configured to contain the mixed air and gas, a circulation zone fluidly connected to the mixing zone and the deposition zone, where the circulation zone is configured to circulate the water and the gas from the deposition area to the mixing zone, a valve fluidly connected to the deposition zone, where the valve is configured to release the mixed gas and water into the formula reservoir, a first temperature sensor, located in the mixing zone, configured to sense a first temperature of the water and the gas when the water and the gas enter the mixing zone, a second temperature sensor located in the deposition zone, configured to sense a second temperature of the water and the gas when the water and the gas enter the deposition zone, and when a predetermined temperature is reached, direct the valve to open, and an opening fluidly coupled to the formula reservoir configured to deposit a mixture of the one or more formulas, the gas, and the water onto a surface.

In some embodiments, the water source is disposed inside the housing. In some embodiments, the gas source is disposed inside the housing. In some embodiments, the dispensing device further includes a temperature source, wherein the temperature source is configured to heat or cool the mixed gas and water. In some embodiments, the circulation zone comprises an insulating tube coupled with the temperature source, where the insulating tube is configured to heat or cool the mixed gas or water.

In some embodiments, the dispensing device further comprises an actuator configured to direct the dispensing device to begin mixing the water and the gas. In some embodiments, the dispensing device further includes a processor configured to receive the first temperature and the second temperature and direct the valve to open in response to the first temperature or the second temperature reaching the predetermined temperature. In some embodiments, the processor is communicatively coupled to a smart device.

In another aspect, a dispensing system including the dispensing device as described herein, and one or more formulas is disclosed.

In some embodiments, the one or more formulas are a liquid, a solid, a gel, a formula disposed within a dissolvable membrane, or combinations thereof. In some embodiments, the one or more formulas are a bleach, a toner, a semi-permanent hair dye, a demi-permanent hair dye, a permanent hair dye, or combinations thereof.

In some embodiments, the system further includes a smart device communicatively coupled to the dispensing device, where the smart device is configured to provide the dispensing device with the predetermined temperature.

In some embodiments, the one or more formulas is contained in a packaging, and wherein the packaging comprises an ID tag. In some embodiments, the smart phone is further configured to read to ID tag, and determine the predetermined temperature based on an identity of the formula.

In yet another aspect, the present disclosure defines a method of temperature controlling a mixture with a dispensing device, the method including dispensing water from a water source and a gas from a gas source, mixing the water and the gas in a mixing zone, measuring a first temperature of the water and the gas, directing the water and the gas into a deposition zone, measuring a second temperature as the water and gas are directed to the deposition zone, comparing the second temperature with the predetermined temperature, and when the second temperature and the predetermined temperature are equal, mixing the gas and water with one or more formulas to form the mixture, and dispensing the mixture onto a surface; or else, directing the water and gas to the circulation zone, and circulating the water and gas to the mixing zone.

In some embodiments, the method further includes heating or cooling the gas and water based on the second temperature and the predetermined temperature while the gas and water are recirculated.

In some embodiments, the method further includes providing a routine for dispensing a plurality of mixtures to the dispensing device, wherein the routine includes a specific predetermined temperature for each mixture of the plurality of mixtures. In some embodiments, the method further includes sequencing the routine based on a specific predetermined temperature for each mixture of the plurality of mixtures, wherein the mixture with the highest predetermined temperature is dispensed first, and the mixture with the lowest predetermined temperature is dispensed last.

In some embodiments, the method further includes loading the device with a one or more formulas. In some embodiments, the method further includes identifying the one or more formulas loaded into the device, and determining the predetermined temperature based on the identity of the one or more formulas.

Figure 1B:
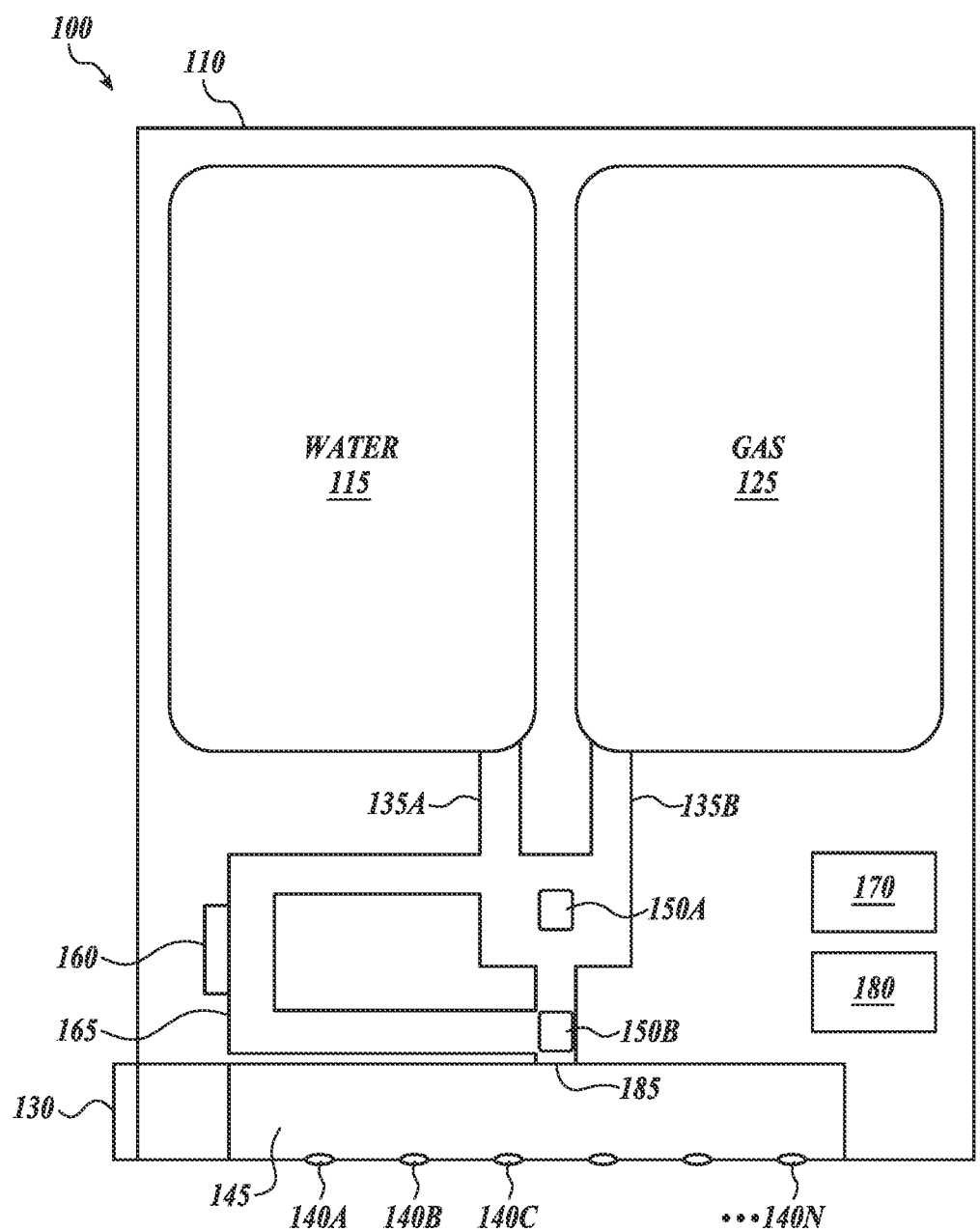
FIG. 1B is an internal view of the example temperature regulation device of FIG. 1A, in accordance with the present technology.
Figure 3:
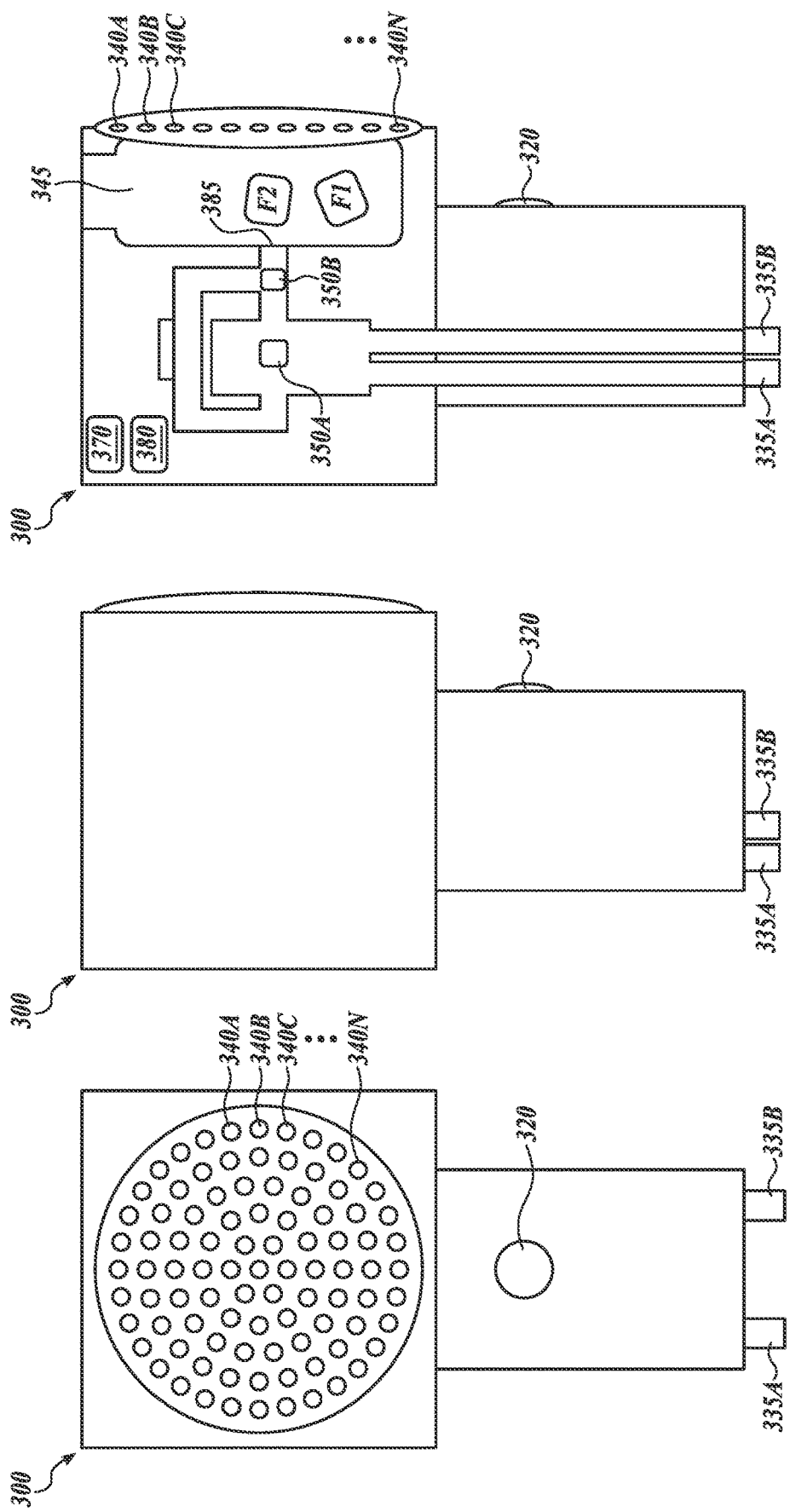
FIG. 3A is another example temperature regulation device, in accordance with the present technology.
FIG. 3B is a perspective view of the example temperature regulation device of FIG. 3A, in accordance with the present technology.
FIG. 3C is an internal view of the example temperature regulation device of FIG. 3A, in accordance with the present technology.

FIG. 1A is an example temperature regulation device 100, in accordance with the present technology. In some embodiments, the device 100 includes a housing 110, an actuator 120, and a plurality of openings 140A, 140B, 140C . . . 140N. In some embodiments, the device further includes a lid 130 connected to a formula reservoir as shown in FIG. 1B. While the device 100 is illustrated as rectangular, it should be understood that the device 100 and the housing 110 can take any number of form factors, including a device with a handle, as shown in FIGS. 3A-3C, a circular or ovular form factor, an organic shape, or a polygon. In some embodiments, the housing 10 is waterproof. In some embodiments, the housing 110 may be plastic, metal, or rubber.

In some embodiments, the device 100 includes an actuator 120. Though the actuator 120 is illustrated in FIG. 1A as a button on the device 100, in some embodiments, the actuator 120 may take the form of a switch, toggle, touch-type capacitive button, or the like. In still other embodiments, the actuator 120 is a user interface, capable of receiving touch input or button input from a user. In other embodiments, the actuator 120 is not located on the housing 110 and may instead be on a smart device, such as a smartphone or tablet. In operation, a user can press or select the actuator 120 to begin circulating water and gas, heat or cool the water and gas, mix with formula, and eventually deposit a mixture onto a surface, as described in detail herein.

In some embodiments, the device 100 includes a lid 130 (or entrance), configured to cover a formula reservoir (as shown in FIG. 1B) where a user may load or unload formula into the device. In some embodiments, the lid 130 may be a raised component, such as a hinged door, but in other embodiments, the lid 130 may be flush with the housing 110 or recessed into the housing 110. In operation, a user or machine can remove the lid 130 to deposit formula into the formula reservoir of the device. In some embodiments, the lid 130 may be a screw on lid, a snap on lid, or the like.

In some embodiments, the device 100 includes a plurality of openings, 140A, 140B, 140C . . . 140N. In some embodiments, the plurality of openings 140A, 140B, 140C . . . 140N are located on a single plane of the device 100. In other embodiments, the plurality of opening 140A, 140B, 140C . . . 140N can be on any number of the surfaces of the device 100. In some embodiments, the plurality of openings 140A, 140B, 140C . . . 140N may be holes, but in other embodiments they may be valves. In operation, water, formula, and gas move through the device 100, and are eventually deposited through the plurality of openings 140A, 140B, 140C . . . 140N as a mixture.

FIG. 1B is an internal view of the example temperature regulation device of FIG. 1A, in accordance with the present technology. In some embodiments, the device 100 further includes a water source 115, a gas source 125, a first connection 135A, a second connection 135B, a formula reservoir 145, a first temperature sensor 150A, a second temperature sensor 150B, a temperature source 160, a circulation component 165, a power source 170, and a processor 180.

In some embodiments, the water source 115 and the gas source 125 are disposed within the housing 110 of the device. In some embodiments, the water source 115, the gas source 125, or both are disposed outside of the housing 110, as shown and described in FIGS. 3A-3C. In some embodiments, the water source 115 is a hot water source or a cold water source. In some embodiments, the water source 115 is a tank of water. In some embodiments, the water source 115 is fully contained within the housing 110. In some embodiments, the water source 115 is removable, replaceable, refillable, or a combination thereof.

In some embodiments, the gas source 125 is a $CO_2$ cartridge. In some embodiments, the gas source 125 is removable, replaceable, refillable, or a combination thereof.

In operation, the water source 115 is configured to dispense water into the first connection 135A. Similarly, the gas source 125 is configured to dispense gas into the second connection 135A. In some embodiments, as the gas and water are dispensed, they mix.

In some embodiments, the device further includes a first and second connection 135A, 135B. In some embodiments, the first connection 135A is configured to connect to the water source. In some embodiments, the second connection 135B is configured to connect to the gas source. In some embodiments, the first and second connections 135A, 135B may be valves or pipes connected to their respective sources 115, 125. In some embodiments, the first and second connections 135A, 135B may be screwed or slotted into place. In some embodiments, the first and second connections 135A, 135B may be slid through an opening in the water source 115 and the gas source 125, respectively.

Figure 2:
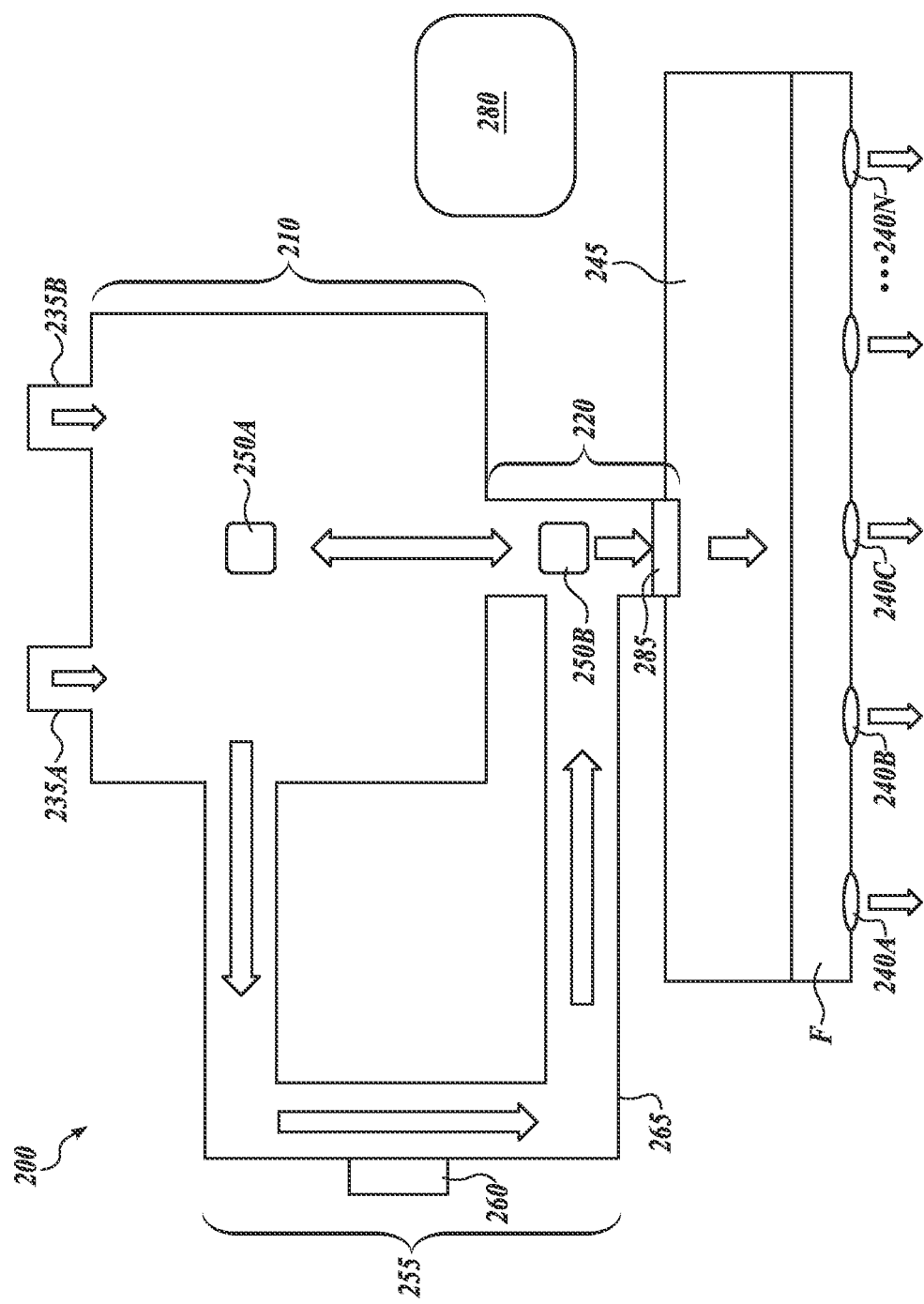
FIG. 2 is an example flow path of an example temperature regulation device, in accordance with the present technology.

In some embodiments, the device 100 further includes a first and second temperature sensor 150A, 150B. In some embodiments, the first temperature sensor 150A is located inside a mixing zone (210, as shown in FIG. 2) of the device 100. In some embodiments, the first temperature sensor 150A is communicatively coupled to a processor 180. In some embodiments, the first temperature sensor 150A is configured to receive a predetermined temperature from the processor to compare to a temperature measured by the first temperature sensor 150A. In some embodiments, the first temperature sensor 150A is configured to send a first temperature to the processor 180. In operation, the first temperature sensor 150A is configured to measure the temperature of the gas and water from the gas source 125 and the water source 115, respectively. As the mixed gas and water flow past the first temperature sensor 150A, the first temperature sensor 150A measures the temperature and transmits the measured temperature to the processor 180. In some embodiments, the water and gas then flow through a circulation component 165, as described herein. The first temperature may be compared to a predetermined temperature by the processor 180. The processor 180 may direct a temperature source 160 to heat up or cool down, to cool or heat the water and gas in the circulation zone based on the difference between the first temperature and the predetermined temperature.

In some embodiments, the second temperature sensor 150B is located inside a deposition zone (220 in FIG. 2), directly before the openings 140A, 140B, 140C . . . 140N, inside the device 100. In some embodiments, the second temperature sensor 150B is communicatively coupled to the processor 180. In some embodiments, the second temperature sensor 150B is configured to receive a predetermined temperature from the processor to compare to a second temperature measured by the second temperature sensor 150B. In other embodiments, the second temperature sensor 150B is configured to send a second temperature to the processor 180. In such embodiments, the processor 180 compares the second temperature and the predetermined temperature. In operation, the second temperature sensor 150B is configured to measure the temperature of the gas and water as they enter the deposition zone, as shown in FIG. 2. As the mixed gas and water flow past the second temperature sensor 150B, the second temperature sensor 150B measures the second temperature and transmits the measured temperature to the processor 180.

In some embodiments, the device 100 includes a temperature source 160. In some embodiments, the temperature source 160 is a heater or a cooler. In some embodiments, the temperature source is located on a circulation component 165, as described herein. In some embodiments, the temperature source 160 is located on the first connection 135A. In some embodiments, the temperature source 160 may be the water source 115, where the water source is configured to heat or cool the water accordingly. In some embodiments, such as when the water source 115 is a sink or a shower post, the water source may be capable of adjusting the temperature of the water based on input from a user or a smart device. In some embodiments, the temperature source 160 is communicatively coupled to a processor. In some embodiments, the temperature source 160 is configured to receive commands from the processor 180, including commands to adjust the temperature emitted from the temperature source 160. For example, the processor 180 may direct the temperature source 160 to heat up or cool down, turn on, or turn off.

In some embodiments, the device 100 includes a circulation component 165 configured to circulate the mixed gas and water. In some embodiments, the circulation component 165 is a pipe or insulating tube. In some embodiments, the circulation component 165 is a ceramic tube. In some embodiments, the circulation component 165 is coupled to the temperature source 160. In such embodiments, the temperature source 160 heats up or cools down, and therefore heats up or cools down the circulation component 165. In some embodiments, the combination of the circulation component 165 and the temperature source 160 combine to form the circulation zone (225 in FIG. 2).

In some embodiments, the device 100 includes a power source 170. In some embodiments, the power source 170 is configured to power the device. In some embodiments, the power source 170 is a battery, a capacitor, or the like. In some embodiments, the power source 170 may have a wired connection, such as a cable configured to plug into an outlet.

In some embodiments, the device 100 includes a processor 180. In some embodiments, the processor 180 is configured to direct the temperature source 160 to heat or cool the mixed gas and water, as described herein. The processor 180 may also be configured to direct the valve 185 to open or close. In some embodiments, the processor stores a predetermined temperature, associated with the optimal temperature of the water, gas, and formula mixture to be dispensed by the device 100. As described herein, in some embodiments, the predetermined temperature may be determined by an identity of the one or more formulas in the device 100, a routine transmitted to the processor 180, or hardcoded into the processor 180.

In some embodiments, the device 100 further includes a valve 185. In some embodiments, the valve 185 is communicatively coupled to the processor 180. In some embodiments, the valve 185 is fluidly coupled to the formula reservoir. When the water and gas is the predetermined temperature, the processor may direct the valve to open, causing the water and gas to flow into the formula reservoir 145.

In some embodiments, the device 100 further includes a formula reservoir 145. In some embodiments, the formula reservoir 145 is configured to hold one or more formulas. In some embodiments, the formula may be a solid, such as a porous solid, a liquid, a gel, or encapsulated in a dissolvable membrane. As the water and gas enter the formula reservoir 145, the water and gas mix with the formula to form a mixture, which is dispensed out of the plurality of openings 140A, 140B, 140C . . . 140N. In some embodiments, the formulation reservoir is directly above and fluidly coupled to the plurality of openings 140A, 140B, 140C . . . 140N.

The device 100 in operation is described in detail in FIG. 2. In some embodiments, water and gas from the water source 115 and the gas source 125, respectively, are dispensed through the first and second connection 135A, 135B, respectively. As the water and gas pass over the first temperature sensor 150A, the first temperature sensor 150A measures the temperature of the water and gas and sends this first temperature to the processor 180. The processor 180 compares the first temperature to the predetermined temperature.

The water and gas then flow into the circulation component 165 (or the circulation zone, as shown and described in FIG. 2), where the water and gas pass by the temperature source 160. In some embodiments, based on the measurement of the first temperature sensor 150A, the temperature source heats or cools, either directly or passively, the water and gas. As the water and gas pass through the circulation component 165, the temperature source 160 heats or cools the water and gas based on the difference between the second measured temperature and the predetermined temperature. For example, if the second measured temperature is higher than the predetermined temperature, the temperature source 160 may reduce the heat it is emitting, turn off, or switch to a cooling mode to allow the gas and liquid to cool. Further, the temperature source 160 may emit cool air or water, for example, to directly cool the gas and water. Similarly, if the second measured temperature is lower than the predetermined temperature, the temperature source 160 may switch to a warming mode, turn on, or heat up to increase the temperature of the water or gas.

Next, the second temperature sensor 150B measures the mixed gas and water as they flow over the second temperature sensor 150B. The second temperature sensor 150B sends this second measured temperature to the processor 180, which compares the second measured temperature to the predetermined temperature. If the second measured temperature and the predetermined temperature are equivalent (or equal) to one another, the processor 180 directs the valve 185 to dispense the mixed gas and water into the formula reservoir 145. The mixed gas and water are mixed with one or more formulas, as described herein, and then deposited through the plurality of openings 140A, 140B, 140C . . . 140N. If the second measured temperature and the predetermined temperature are not equal, the mixed gas and water are recirculated with the circulation component 165, which directs the gas and water back to the first temperature sensor 150A, and back into the circulation component 165. Once the water and gas meet the predetermined temperature, the valve 185 opens and the water and gas are dispensed into the formula reservoir 145, mixed with the formula, and are dispensed through the plurality of openings 140A, 140B, 140C . . . 140N.

FIG. 2 is an example flow path of an example temperature regulation device, in accordance with the present technology. In some embodiments, the device includes at least three zones: the mixing zone 210, the dispensing zone 220, and the circulation zone 225. While one configuration is illustrated in FIG. 2, it should be understood that the flow path can take any form, and the three zones may be in any orientation. Further, each of the three zones 210, 220, and 225 are optional.

In some embodiments, the mixing zone 210 is fluidly coupled to a first connection 235A connected to a water source, and a second connection 235B connected to a gas source. The mixing zone 210 is configured to allow the gas and the water to mix. In some embodiments, the mixing zone 210 includes a stirrer or other mechanism to aid in mixing. In some embodiments, the mixing zone 210 allows the water and gas to mix passively, as they flow through the device 100.

In some embodiments, a first temperature sensor 250A is located inside the mixing zone 210. As the gas and water flows downwards, following the flow path illustrated as arrows, the first temperature sensor 250A measures the gas and water temperature. The first temperature sensor 250A sends a first temperature to the processor 280. The processor 280 compares the first temperature to a predetermined temperature and directs the temperature source 260 to heat up or cool down. The gas and water then enter the circulation zone 255.

It should be understood that while the circulation zone 225 is illustrated as a separate zone, away from the mixing zone 210 and deposition zone 220, for clarity in visualizing the flow path, in some embodiments, the circulation zone is between the mixing zone and the deposition zone. In some embodiments, the circulation zone is the space between the first temperature sensor 250A and the second temperature sensor 250B. Any configuration or layout of the circulation zone 255 which allows the water and gas to pass by the first temperature sensor 250A and the second temperature sensor 250B may be utilized. In some embodiments, the circulation zone 225 includes a temperature source 260 and an insulating tube 265. While the insulating tube 265 is illustrated as separate from the mixing zone 210 and the deposition zone 220, in some embodiments, the insulating tube 265 is between the first temperature sensor 250A and the second temperature sensor 250B in the mixing zone 210 and the deposition zone 220, respectively. After the gas and water flow through the circulation zone, the gas and water flow into the deposition zone 220.

In some embodiments, a second temperature sensor 250B is located in the deposition zone 220. In the deposition zone 220, the second temperature sensor 250B measures a second temperature of the water and gas and transmits the second temperature to the processor 280. If the second temperature matches a predetermined temperature, the processor may then direct a valve 285 to open and deposit the water and gas into the formula reservoir 245. If the second temperature does not match the predetermined temperature, the processor 280 does not direct the valve 285 to open, and the water and gas move back to the first temperature sensor 250A and back into the circulation zone 255.

In some embodiments, the valve 285 is fluidly coupled with a formula reservoir 245. The formula reservoir 245 is configured to hold formula F. In some embodiments, the formula reservoir 245 is further configured to mix the water and gas with the formula F, such as with a stirrer. In some embodiments, the mixing of the water, gas, and formula happens passively, as the water and gas flow through the device 200. In some embodiments, the formula F is a liquid, a solid, or a gel. In some embodiments, the formula F is a porous solid, configured to allow the water and gas to flow through it. In some embodiments, the formula F is contained in a dissolvable membrane. In some embodiments, the formula F is a bleach, a toner, a semi-permanent hair dye, a demi-permanent hair dye, or a washout hair dye. In some embodiments, the predetermined temperature is an optimal temperature for activating the formula F to achieve the fastest processing time for the specific formula F. In some embodiments, the predetermined temperature is the optimal temperature for enabling a reaction of an oxidant and a colorant mechanism in the formula F. In some embodiments, the predetermined temperature is an optimal temperature for enabling efficient deposition of the formula F.

In operation, gas and water are dispensed from a gas source and water source, respectively, through the second connection 235B and the first connection 235A, respectively. The gas and water flow from the first and second connection 235A, 235B into the mixing zone 210. In the mixing zone 210, the gas and water mix, and a first temperature is taken by the first temperature sensor 250A. In some embodiments, the first temperature is transmitted to the processor 280. The water and gas then flow through the circulation zone 255 and are heated or cooled depending on the difference between the first temperature and the predetermined temperature. The water and gas then enter the deposition zone 220. A second temperature of the gas and water is taken by the second temperature sensor 250B and compared to the predetermined temperature. If the second temperature and the predetermined temperature match, the second temperature sensor 250B or the processor 280 direct the valve 285 to open, and the gas and water enter the formula reservoir 245. In the formula reservoir 245, the water and gas are mixed with formula F and is dispensed through the openings 240A, 240B, 240C . . . 240N.

FIG. 3A is another example temperature regulation device 300, in accordance with the present technology. In some embodiments, the device 300 is handheld. In some embodiments, the device 300 includes an actuator 320, a first connection 335A, a second connection 335B and a plurality of openings 340A, 340B, 340C . . . 340N.

Figure 4:
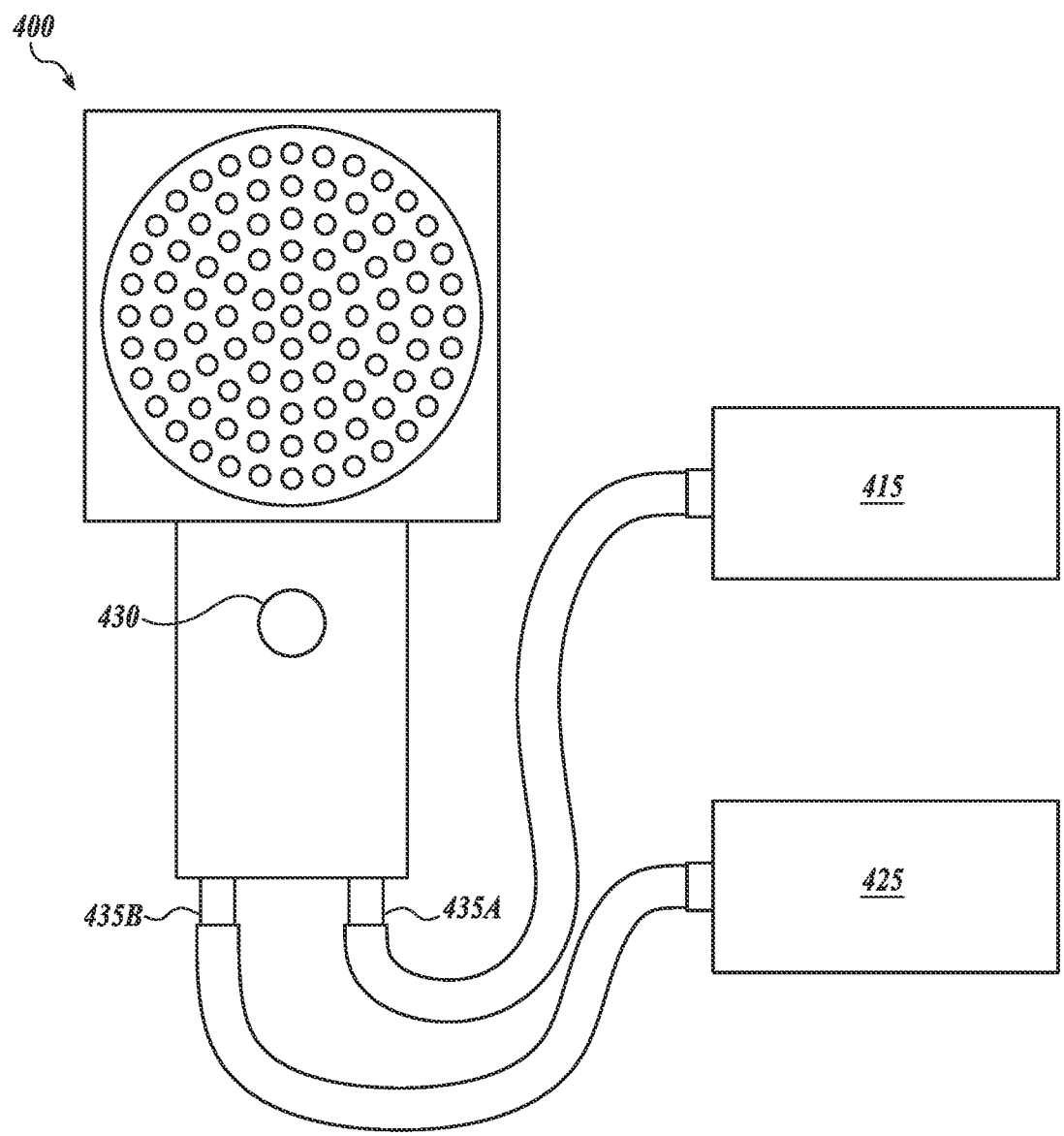
FIG. 4 shows an example temperature regulation device connected to an external water source and an external gas source, in accordance with the present technology.

In some embodiments, the first connection 335A and the second connection 335B are disposed on the device, such as when a gas source, a water source, or both, are external to the device 300. While the first and second connections 335A, 335B are illustrated as protruding from the device 300, in some embodiments, they may be recessed into the device 300. In some embodiments, the first and second connections 335A, 335B are configured to attach to a water source and a gas source, respectively, either directly or with an additional adaptor as shown in FIG. 4. In some embodiments, the first and second connections 335A, 335B may be threaded, configured to snap onto the respective source, or magnetized.

While the plurality of openings 340A, 340B, 340C . . . 340N are arranged in a circle, it should be understood that the plurality of openings can take any form or orientation. In some embodiments, the plurality of openings 340A, 340B, 340C . . . 340N are fluidly coupled with the internal components of the device 300 as shown in FIG. 3C.

FIG. 3B is a perspective view of the example temperature regulation device of FIG. 3A, in accordance with the present technology.

In some embodiments, the actuator 320 may protrude from the device 300, but it should be understood that the actuator 230 may also be flush with the device 300 or recessed. In operation, when a user presses the actuator 230, the device 300 takes in both water and gas through the first connection 335A and the second connection 335B, respectively.

FIG. 3C is an internal view of the example temperature regulation device 300 of FIG. 3A, in accordance with the present technology. In some embodiments, the device 300 may include a first temperature sensor 350A, a second temperature sensor 350B, a power source 370, and a processor 380. In some embodiments, the device may further include a formula reservoir 345, configured to hold one or more formulas F.

In some embodiments, the formula F may be enclosed in a dissolvable membrane, such as is illustrated in FIG. 3C. In such embodiments, the dissolvable membrane may dissolve in response to the water and gas entering the formula reservoir 345. In some embodiments, the formula reservoir 345 may have an opening that allows a user to deposit or load the device 300 with the formula F.

FIG. 4 shows the example temperature regulation device of FIG. 3A connected to an external water source 415 and an external gas source 425, in accordance with the present technology.

In some embodiments, the device 400 is configured to attach to an external water source 415 and an external gas source 425. In some embodiments, the external water source 415 may be a water tank, a sink, a water line, a shower post, or the like. In some embodiments, the external gas source 425 may be a gas cartridge, such as a $CO_2$ cartridge, a gas line, or the like.

In operation, a user can connect the first connection 435A to a water source 415, and the second connection 435B to a gas source 425. In some embodiments, the user may utilize another adaptor as illustrated, but in other embodiments, the user may connect the sources the device 400 directly.

Figure 5:
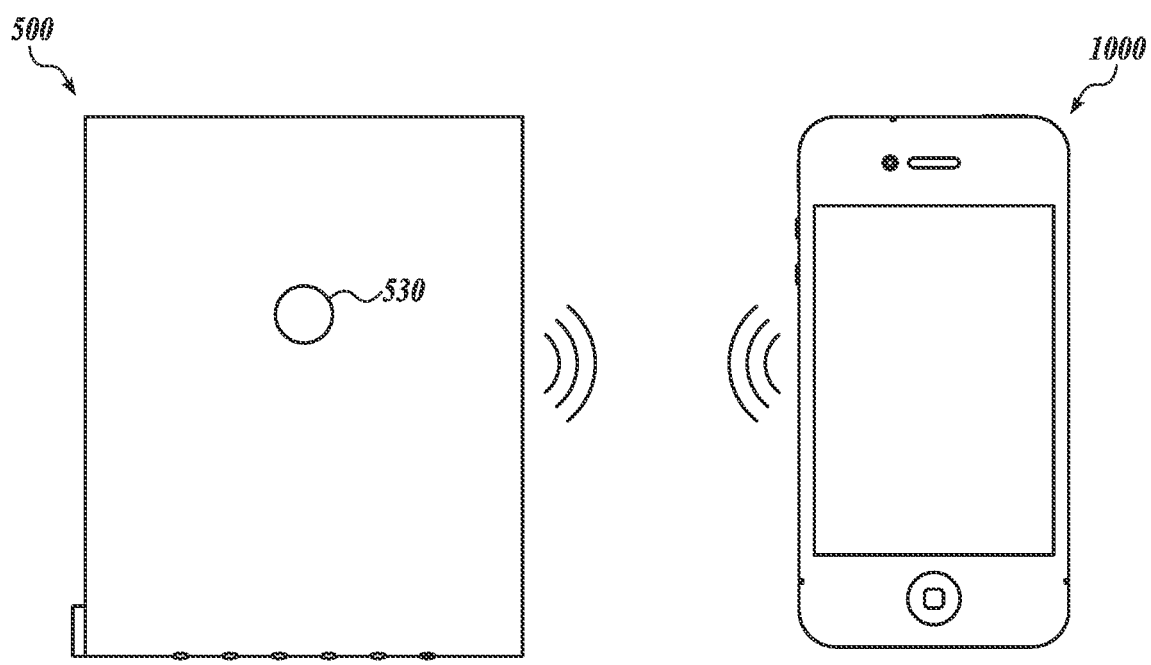
FIG. 5 is an example system, in accordance with the present technology.

FIG. 5 is an example system, in accordance with the present technology. In some embodiments, a system including a device 500 (or any device 100, 200, 300, 400 as described herein) and a smart device 1000 is disclosed. In some embodiments, the device 500 and the smart device 1000 are communicatively coupled to one another, such as through Bluetooth LTE, cellular data, Wi-Fi, RFID, a wired connection, or the like. While the smart device is illustrated as a smart phone, the smart device can take any form, such as a tablet, computer, or the like.

In some embodiments, the smart device 1000 may include, in addition to or in place of actuator 530, an application that allows a user to direct the device 500 to perform the temperature regulation as described herein. In some embodiments, the smart device may provide the device 500 with the predetermined temperature, receive the first and second temperatures from the first and second temperature sensors (not pictured in FIG. 5) or control the valve (not pictured in FIG. 5). In some embodiments, the user can select a formula or routine with the smart device to determine the predetermined temperature, as described in detail herein.

Figure 6:
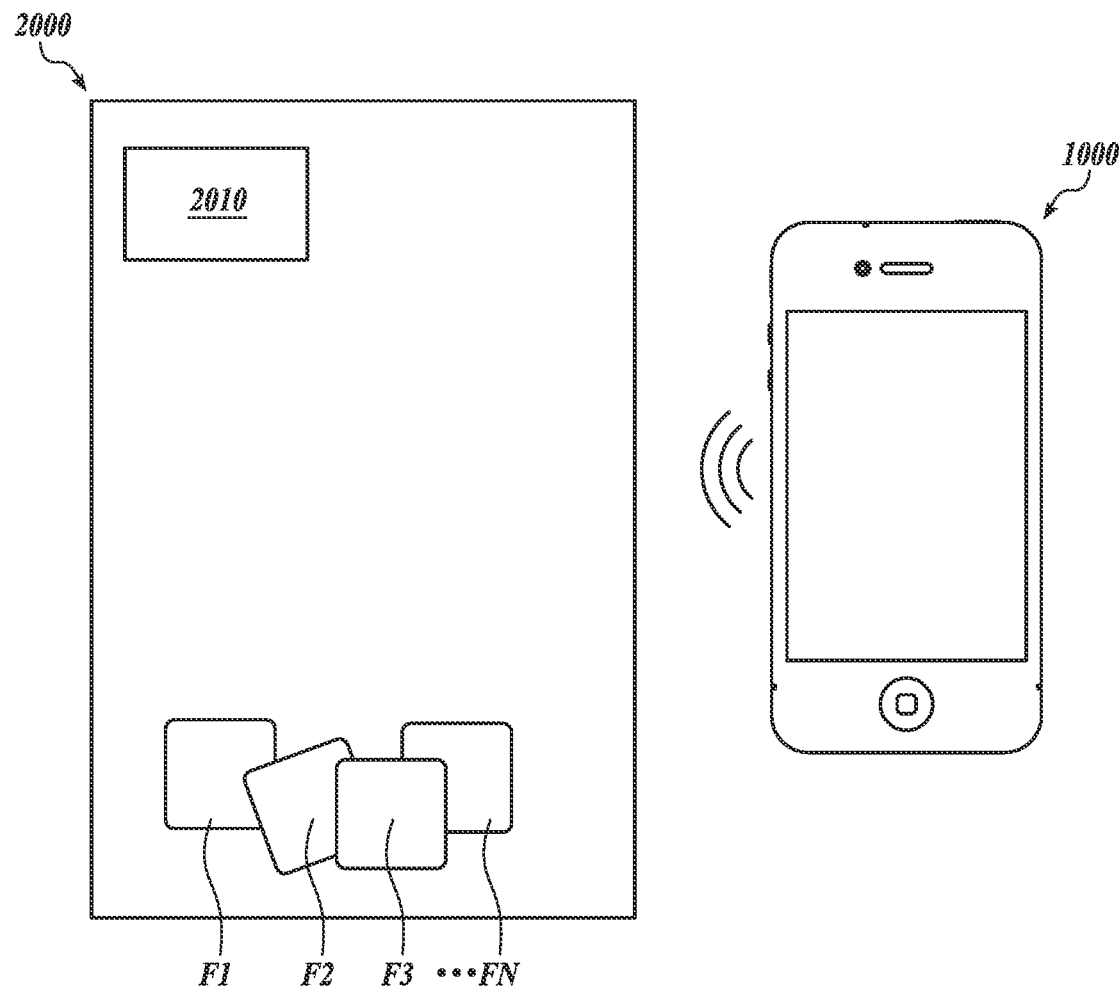
FIG. 6 is an example formula inside example packaging, in accordance with the present technology.

FIG. 6 is example formula F inside example packaging 2000, in accordance with the present technology. In some embodiments, the system further includes a plurality of formulas F1, F2, F3 . . . FN. In some embodiments, the plurality of formula F1, F2, F3 . . . FN is disposed within a packaging 2000. While the formula F1, F2, F3 . . . FN is illustrated as formula encapsulated in dissolvable membranes (or "pods"), the formula may also be a liquid, a solid, a gel, or the like. In some embodiments, the formulas F1, F2, F3 . . . FN are a hair dye formula, such as bleach, toner, semi-permanent hair dye, or demi-permanent hair dye.

In some embodiments, the packaging 2000 further includes an identifier 2010. In some embodiments, the identifier 2010 may be a QR code, an RFID tag, or the like. In operation, the identifier 2010 identifies the plurality of formulas F1, F2, F3 . . . FN inside the packaging and can direct a smart device 1000 to tell the device 500 the predetermined temperature. In some embodiments, the device 500 includes a component capable of reading the identifier 2010, so that the device 500 receives the predetermined temperature directly. In some embodiments, each formula of the plurality of formulas F1, F2, F3 . . . FN In some embodiments, the packaging 2010 may include more than one formula F1, F2, F3 . . . FN. In such embodiments, the identifier 2010 may include a routine, transmitting to the smart device 1000 the order in which the formulas F1, F2, F3 . . . FN should be applied. In some embodiments, the smart device 1000 or the device 500 generates the routine based on one or more identifiers 2010 on one or more packaging 2000.

Figure 7:
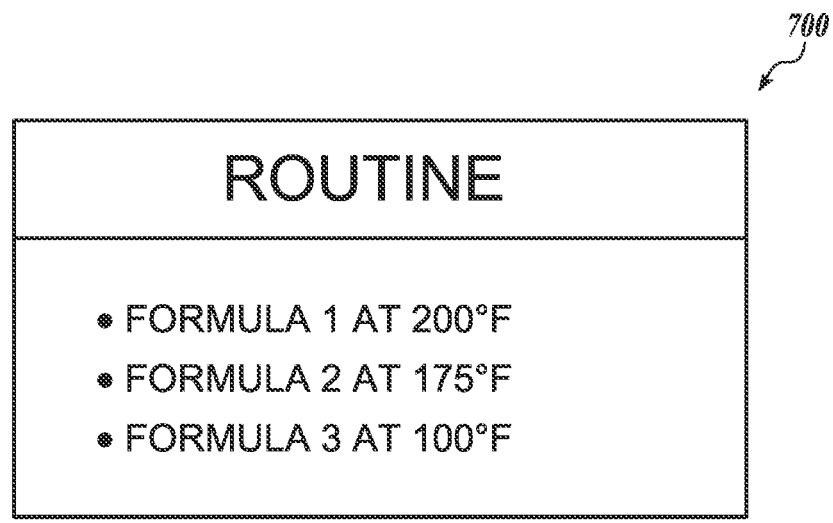
FIG. 7 is an example routine, in accordance with the present technology.

FIG. 7 is an example routine 700, in accordance with the present technology. In some embodiments, the smart device, the device, or the packaging identifier generates a routine for depositing one or more formulas F1, F2, F3 . . . FN. In some embodiments, the routine 700 is ordered based on a prescribed order of formulas F1, F2, F3 . . . FN. For example, the routine 700 may instruct the device to apply a bleach first, then a toner, and finally a hair dye. In some embodiments, the routine 700 may be ordered based on the predetermined temperature for each device. In this manner, the device may heat the water and gas to the highest temperature, and then allow the water and gas to cool to the lower temperatures, decreasing the amount of power needed to heat the water and gas. It should be understood that the routine 700 is an example, and any order of formulas can be generated, at any number of predetermined temperatures.

In the illustrated routine a first formula is dispensed at a temperature of 200° F. The device then allows the water and gas to cool to 175° F. before dispensing the second formula. Finally, the third formula is dispensed at 100° F. In this manner, the processor of the device can adjust the predetermined temperature based on each step in the routine.

Figure 8:
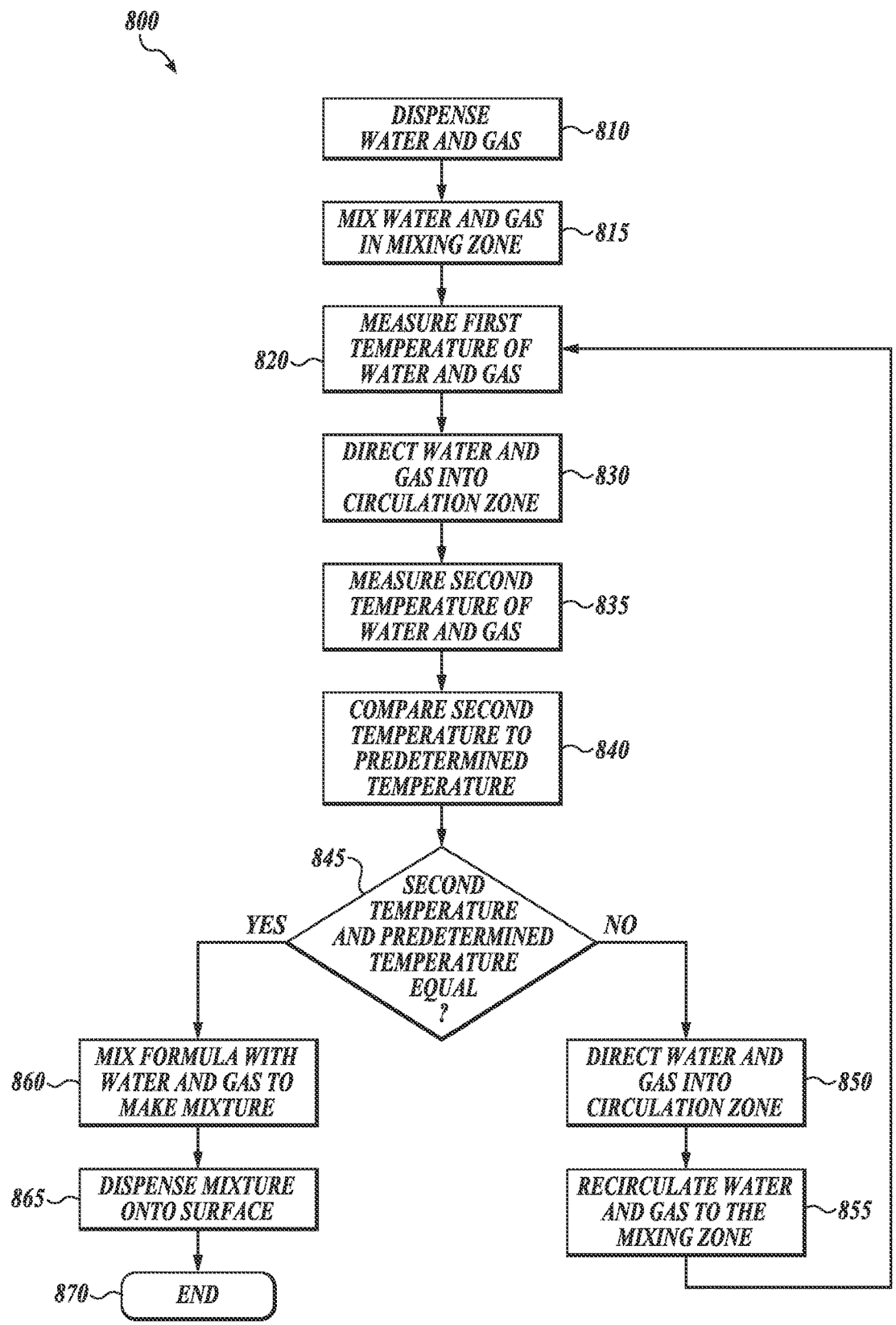
FIG. 8 is an example method of dispensing a formula, in accordance with the present technology.

FIG. 8 is an example method 800 of dispensing a formula, in accordance with the present technology. The method begins in block 810, when water and gas is dispensed from a water source and a gas source, respectively. As described herein, in some embodiments, the water and gas enter into a mixing zone through a first and second connection, respectively. In block 815, the water and gas are mixed in a mixing zone. In some embodiments, the mixing zone includes a component for mixing the water and gas, such as a stirrer or pump.

In block 820, a first temperature of the water and gas is measured. In some embodiments, the first temperature is measured by a first temperature sensor. In some embodiments, the first temperature sensor transmits the first temperature to a processor. In some embodiments, the processor compares the first temperature with a predetermined temperature and directs a heat source to heat or cool the water accordingly.

In block 830, the water and gas are directed into a circulation zone. As described herein, the circulation zone may be a separate component, or may be the space between the first and a second temperature sensor. In some embodiments, the circulation zone includes the temperature source. As the gas and water flow into the circulation zone, the temperature source cools or heats the water and gas based on the first temperature and the predetermined temperature.

In block 835, a second temperature of the water and gas is measured. In some embodiments, the second temperature is measured by the second temperature sensor. The method 800 proceeds in block 840. In block 840, the second temperature is compared with the predetermined temperature.

In decision block 845, it is determined whether the second temperature and the predetermined temperature are equal. In some embodiments, the second temperature sensor transmits the second temperature to the processor, which determines if the second temperature and the predetermined temperature are equal. If the second temperature and the predetermined temperature are not equal, the method proceeds to block 850.

In block 850, the water and gas are directed back into the circulation zone to be further heated or cooled, based on the second temperature. In some embodiments, the processor directs the temperature source to increase in temperature, decrease in temperature, turn off, or turn on based on the difference between the predetermined temperature and the second temperature.

In block 855, the water and gas are recirculated into the mixing zone, and the method returns to block 820.

Returning to decision block 845, if the second temperature and the predetermined temperature are equal, the method proceeds to block 860. In some embodiments, "equal" is defined as exactly the predetermined temperature, within 5%, 10%, or 15% of the predetermined temperature, or within 5 degrees of the predetermined temperature in Fahrenheit or Celsius. In some embodiments, the definition of equal is hardcoded into the processor. In some embodiments, the definition of equal may be selected by a user or based on the identity of the one or more formulas inside the device.

In block 860, the water and gas mix with formula to form a mixture. In some embodiments, the mixture is a bleach, a toner, a semi-permanent hair dye, or a permanent hair dye. In block 865, the mixture is dispensed onto a surface. In some embodiments, the surface is hair or skin.

In block 870, the method ends.

Figure 9:
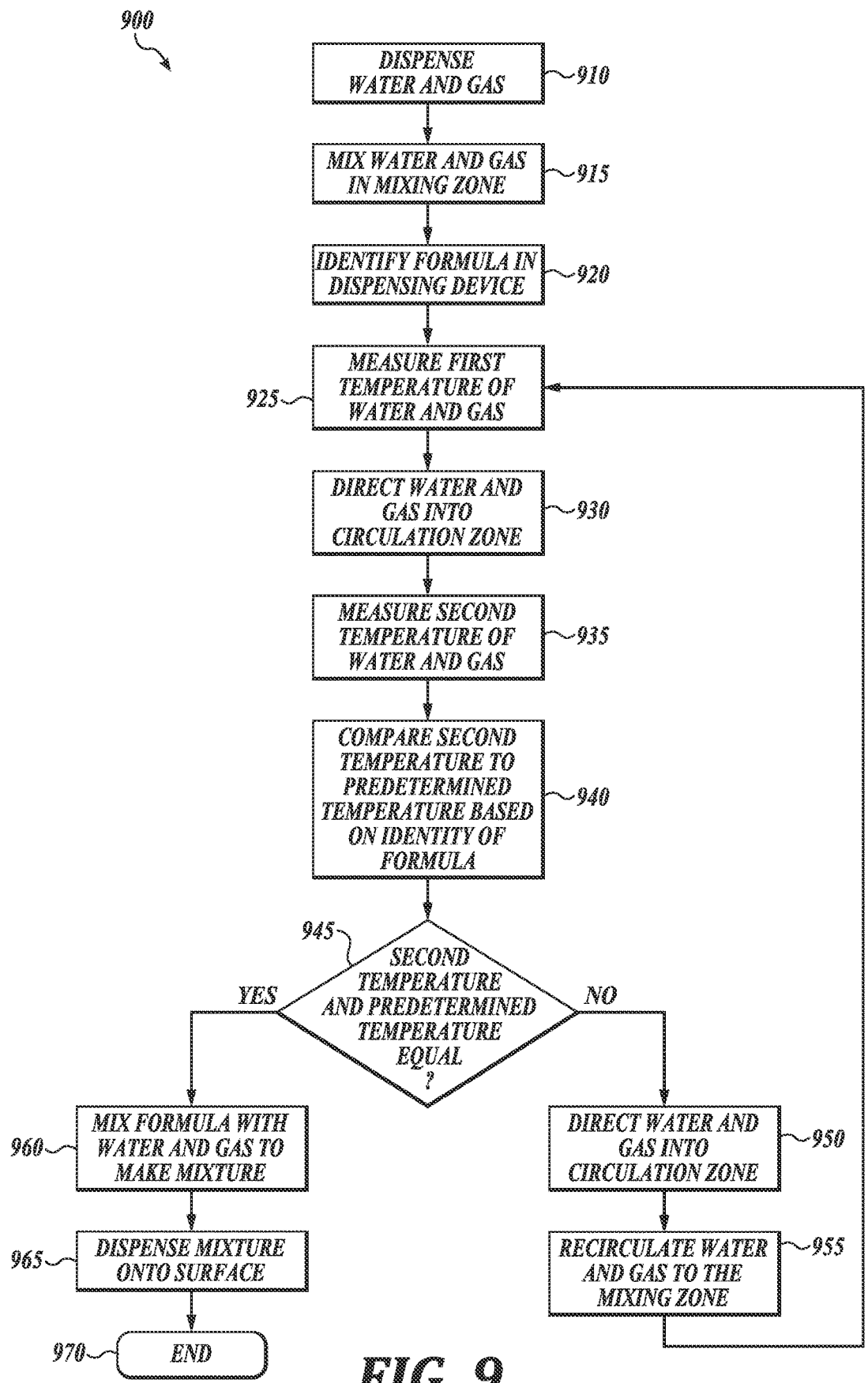
FIG. 9 is an example method of dispensing a formula based on the identity of the formula, in accordance with the present technology.

FIG. 9 is an example method 900 of dispensing a formula based on the identity of the formula, in accordance with the present technology. In block 910, the method begins.

In block 910, water and gas are dispensed into the device, as described herein. In block 915, the water and gas mix together in the mixing zone.

In block 920, the formula inside the dispensing device is identified. In some embodiments, block 920 may happen before block 910 or 915. In some embodiments, the formula may be identified by the user and input into the device. In some embodiments, the formula may be identified with an identifier on the formula's packaging. In some embodiments, the smart device may identify the formula and transmit the identity and predetermined temperature to the device. In some embodiments, the device may determine the identity of the formula when it is loaded.

In block 930, the gas and water are directed into the circulation zone. In some embodiments, the circulation zone includes the temperature source. As the gas and water flow into the circulation zone, the temperature source cools or heats the water and gas based on the first temperature and the predetermined temperature.

In block 935, the second temperature is measured. In some embodiments, the second temperature is measured by the second temperature sensor. In block 940, the second temperature and the predetermined temperature based on the identity of the formula is compared. In some embodiments, the identity of the formula is linked to the predetermined temperature.

In decision block 945, the second temperature and the predetermined temperature are determined to be either equal or not equal. As described herein, in some embodiments, "equal" is defined as exactly the predetermined temperature, within 5%, 10%, or 15% of the predetermined temperature, or within 5 degrees of the predetermined temperature in Fahrenheit or Celsius. In some embodiments, the definition of equal is hardcoded into the processor. In some embodiments, the definition of equal may be selected by a user or based on the identity of the one or more formulas inside the device.

If the predetermined temperature and the second temperature are not determined to be equal, the method proceeds to block 950. In block 950, the water and gas are directed back into the circulation zone. In block 955, the water and gas are recirculated into the mixing zone. Then, the method returns to block 925.

Returning to decision block 945, if the predetermined temperature and the second temperature are determined to be equal, the method proceeds to block 960. In block 960, formula, water, and gas are mixed to form a mixture. In block 965, the mixture is then deposited onto a surface, such as a user's hair, skin, or hand.

In block 970, the method ends.

Figure 10:
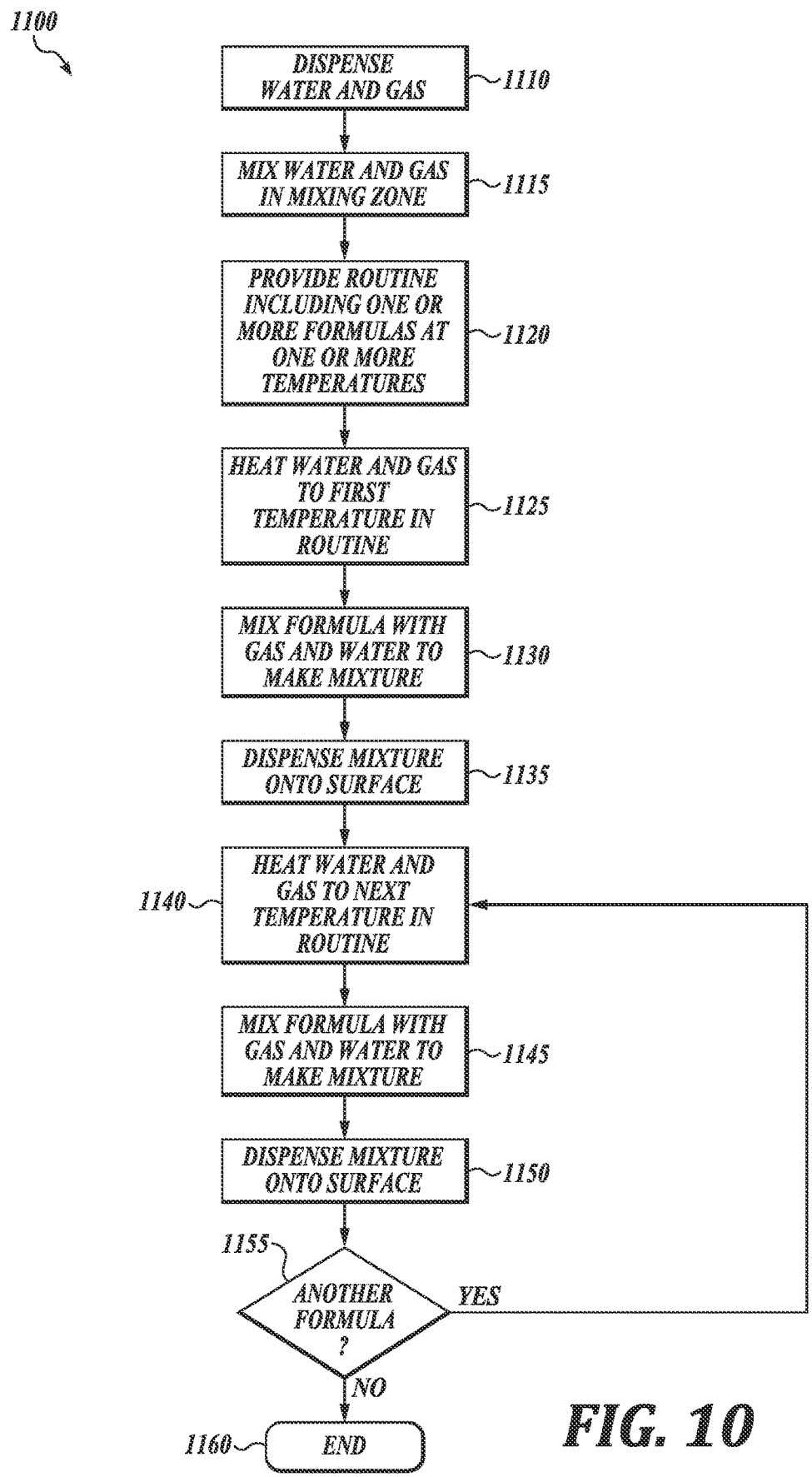
FIG. 10 is an example method of dispensing a formula based on a routine, in accordance with the present invention.

FIG. 10 is an example method 1100 of dispensing a formula based on a routine, in accordance with the present invention. The method begins with block 1110. In block 1110, water and gas are dispensed. In block 1115, water and gas are mixed in the mixing zone.

In block 1120, a routine is provided that includes one or more formulas at one or more temperatures. In some embodiments, block 1120 happens before block 1110 or 1115. In some embodiments, the device provides the routine. In some embodiments, the smart device or the formulas' packaging provides the routine. In some embodiments, the routine includes an ordered list of formulas, all having a predetermined temperature. In some embodiments, the routine is determined based on the identity of each formula. In some embodiments, the routine is determined based on the predetermined temperature associated with each formula. In some embodiments, the routine orders the formulas so that the formula associated with the highest predetermined temperature is dispensed first, followed by the next highest predetermined temperature, and so on.

In block 1125, the water and gas are heated or cooled to the first predetermined temperature in the routine. In some embodiments, the block 1125 may include any of the methods disclosed herein, and specifically may include blocks 820 to 870 of method 800 or blocks 925-970 of method 900.

In block 1130, the formula is mixed with water and gas to make a first mixture. In block 1135, the first mixture is dispensed onto a surface.

In block 1140, the water and gas are heated or cooled to a second predetermined temperature associated with a second formula. In some embodiments, such as when the routine is ordered to dispense the highest predetermined temperature first, a temperature source within the device may turn off or otherwise reduce power to reduce the temperature of the water and gas. As with block 1125, block 1140 may also include any of the methods disclosed herein, and specifically may include blocks 820 to 870 of method 800 or blocks 925-970 of method 900.

In block 1145, the formula is mixed with the water and gas to make a mixture. In block 1150, the mixture is dispensed onto a surface, such as a user's hair or skin.

In decision block 1155, it is determined whether there is another formula on the routine. If there is another formula on the routing, the method returns to block 1140.

Returning to block 1155, if there is no other formula on the routine, the method proceeds to block 1160.

In block 1160, the method ends.

The order in which some or all of the blocks in the method should not be deemed to be limiting. Rather, one or ordinary skill in the art having the benefit of the present disclosure will understand that some of the blocks may be executed in a variety of orders not illustrated, or even in parallel.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A dispensing device, comprising:
   a housing configured to surround the dispensing device;
   a first connection configured to connect to a water source;
   a second connection configured to connect to a gas source;
   a formula reservoir configured to hold one or more formulas;
   a mixing zone configured to mix water from the water source, and gas from the gas source;
   a deposition zone configured to contain the mixed air and gas;
   a circulation zone fluidly connected to the mixing zone and the deposition zone, wherein the circulation zone is configured to circulate the water and the gas from the deposition area to the mixing zone;
   a valve fluidly connected to the deposition zone, wherein the valve is configured to release the mixed gas and water into the formula reservoir;
   a first temperature sensor, located in the mixing zone, configured to sense a first temperature of the water and the gas when the water and the gas enter the mixing zone;
   a second temperature sensor located in the deposition zone, configured to sense a second temperature of the water and the gas when the water and the gas enter the deposition zone, and when a predetermined temperature is reached, direct the valve to open; and
   an opening fluidly coupled to the formula reservoir configured to deposit a mixture of the one or more formulas, the gas, and the water onto a surface.

2. The dispensing device of claim 1, wherein the water source is disposed inside the housing.

3. The dispensing device of claim 1, wherein the gas source is disposed inside the housing.

4. The dispensing device of claim 1, wherein the dispensing device further comprises a temperature source, wherein the temperature source is configured to heat or cool the mixed gas and water.

5. The dispensing device of claim 4, wherein the circulation zone comprises an insulating tube coupled with the temperature source, wherein the insulating tube is configured to heat or cool the mixed gas or water.

6. The dispensing device of claim 1, wherein the dispensing device further comprises an actuator configured to direct the dispensing device to begin mixing the water and the gas.

7. The dispensing device of claim 1, wherein the dispensing device further comprises a processor configured to receive the first temperature and the second temperature and direct the valve to open in response to the first temperature or the second temperature reaching the predetermined temperature.

8. The dispensing device of claim 7, wherein the processor is communicatively coupled to a smart device.

9. A dispensing system comprising:
   dispensing device of claim 1; and
   one or more formulas.

10. The dispensing system of claim 9, wherein the one or more formulas are a liquid, a solid, a gel, a formula disposed within a dissolvable membrane, or combinations thereof.

11. The dispensing system of claim 9, wherein the one or more formulas are a bleach, a toner, a semi-permanent hair dye, a demi-permanent hair dye, a permanent hair dye, or combinations thereof.

12. The dispensing system of claim 9, wherein the system further comprises a smart device communicatively coupled to the dispensing device, wherein the smart device is configured to provide the dispensing device with the predetermined temperature.

13. The dispensing system of claim 12, wherein the one or more formulas is contained in a packaging, and wherein the packaging comprises an ID tag.

14. The dispensing system of claim 13, wherein the smart phone is further configured to read to ID tag, and determine the predetermined temperature based on an identity of the formula.

15. A method of temperature controlling a mixture with a dispensing device, the method comprising:
   dispensing water from a water source and a gas from a gas source;
   mixing the water and the gas in a mixing zone;
   measuring a first temperature of the water and the gas;
   directing the water and the gas into a circulation zone;
   measuring a second temperature;
   comparing the second temperature with the predetermined temperature, and when the second temperature and the predetermined temperature are equal
   mixing the gas and water with one or more formulas to form the mixture; and
   dispensing the mixture onto a surface; or else,
   directing the water and gas back to the circulation zone; and
   circulating the water and gas back into the mixing zone.

16. The method of claim 15, wherein the method further comprises heating or cooling the gas and water based on the second temperature and the predetermined temperature while the gas and water are recirculated.

17. The method of claim 15, wherein the method further comprises providing a routine for dispensing a plurality of mixtures to the dispensing device, wherein the routine includes a specific predetermined temperature for each mixture of the plurality of mixtures.

18. The method of claim 17, wherein the method further comprises sequencing the routine based on a specific predetermined temperature for each mixture of the plurality of mixtures, wherein the mixture with the highest predetermined temperature is dispensed first, and the mixture with the lowest predetermined temperature is dispensed last.

19. The method of claim 15, wherein the method further comprises loading the device with a one or more formulas.

20. The method of claim 19, wherein the method further comprises:
   identifying the one or more formulas loaded into the device, and determining the predetermined temperature based on the identity of the one or more formulas.

\* \* \* \* \*